United States Patent [19]

Giraud

[11] 4,048,923
[45] Sept. 20, 1977

[54] RETURN LOOP FOR TRANSPORT VEHICLES
[75] Inventor: François Louis Giraud, Plaisir, France
[73] Assignee: Savec, Maurepas, France
[21] Appl. No.: 672,129
[22] Filed: Mar. 31, 1976
[30] Foreign Application Priority Data
  Apr. 3, 1975   France .................. 75.10440
[51] Int. Cl.² .......................... B61J 1/12; B61K 1/00
[52] U.S. Cl. ........................................ 104/21; 104/35; 104/165
[58] Field of Search .................. 104/1 R, 18, 20, 21, 104/25, 35, 147 R, 165, 172 R, 172 B; 198/321, 324, 334, 472; 295/8.5, 34; 272/46, 47

[56] References Cited
U.S. PATENT DOCUMENTS

| 368,420 | 8/1887 | Pearsons | 104/21 |
| 961,532 | 6/1910 | Reinehr | 295/8.5 |
| 1,446,784 | 2/1923 | Carter | 295/8.5 X |
| 2,541,514 | 2/1951 | Herold | 295/8.5 |
| 3,339,494 | 9/1967 | Lauber | 104/20 |
| 3,417,991 | 12/1968 | Novak | 272/46 X |
| 3,727,558 | 4/1973 | Winkle | 104/21 |

*Primary Examiner*—Robert J. Spar
*Assistant Examiner*—Randolph A. Reese

[57] ABSTRACT

Terminal station return loop device for vehicles, containers or platforms driven continuously along a transport system, which comprises essentially a chain conveyor forming a loop having a relatively short radius of curvature and passing over a platform driven at the same speed as the conveyor, and at least one vehicle equipped with two trains of wheels, i.e. carrier wheels rolling on a fixed rail of the transport line which terminates at the inlet of the platform with a bevelled end, and drive wheels engaging the conveyor chain at the end of an endless belt driving shoes supporting the vehicle when the carrier wheels leave the rail for slipping on the platform by means of their edges.

4 Claims, 5 Drawing Figures

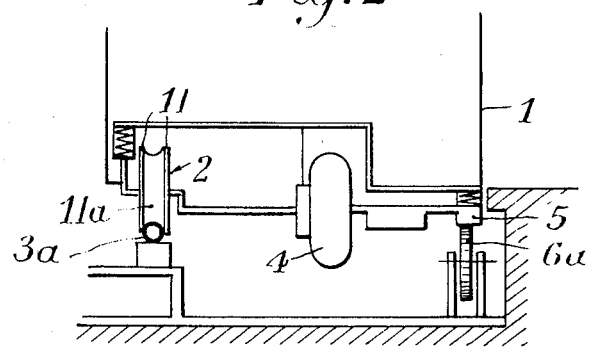
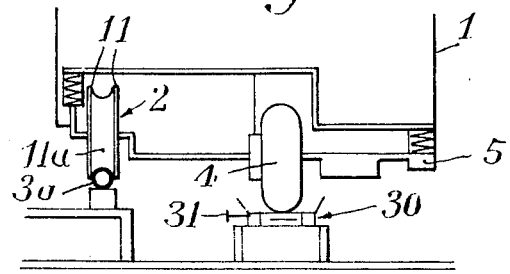
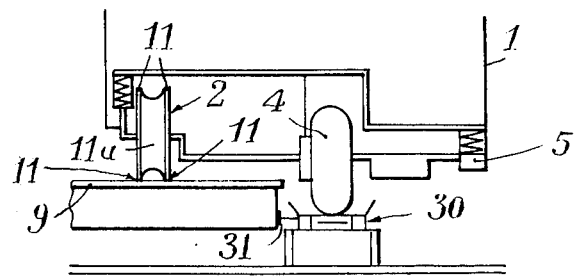
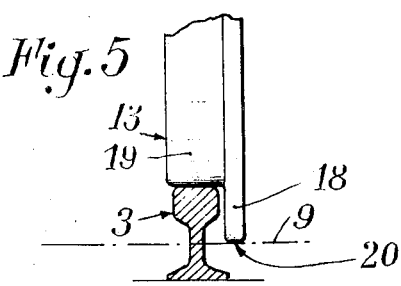

RETURN LOOP FOR TRANSPORT VEHICLES

Up to now in all transport systems using cars, containers or other vehicles, the problem of returning the vehicles at the end of the line under minimum space conditions has not been solved satisfactorily.

The present invention provides an end-of-line or terminal station loop device for returning vehicles continuously from the incoming to the return line without exceeding a radius of curvature of two to three meters.

To this end, the vehicle frame is equipped with two trains of wheels, namely at least two aligned carrier wheels having a horizontal axis, which roll on the fixed line rail, and at least one wheel parallel with and laterally spaced from, said aligned wheels, disposed for engagement with the links of a chain conveyor passing over a plain platform rotating at the same peripheral velocity, said carrier wheels when released from said line rail being adapted to roll or slide on said platform while the vehicle proper is rotatably driven by the fixed lateral wheels engaging the top surface of the conveyor chain.

The line rail supporting the carrier wheels terminates with a bevel portion overlying the rotary platform to enable said carrier wheels to rest thereupon, and to this end these wheels have two peripheral contact surfaces enabling them to bear either on the rail or on the platform.

Other features and advantages of this device will now be described more in detail with reference to the accompanying drawing, in which:

FIG. 2 is a diagrammatic vertical section taken in the plane II—II of FIG. 1.

FIG. 3 is a diagrammatic section taken in the plane III—III of FIG. 1.

FIG. 4 is another section taken in the plane IV—IV of FIG. 1, and

FIG. 5 is a diagrammatic detail view showing a modified embodiment.

Figure 1:
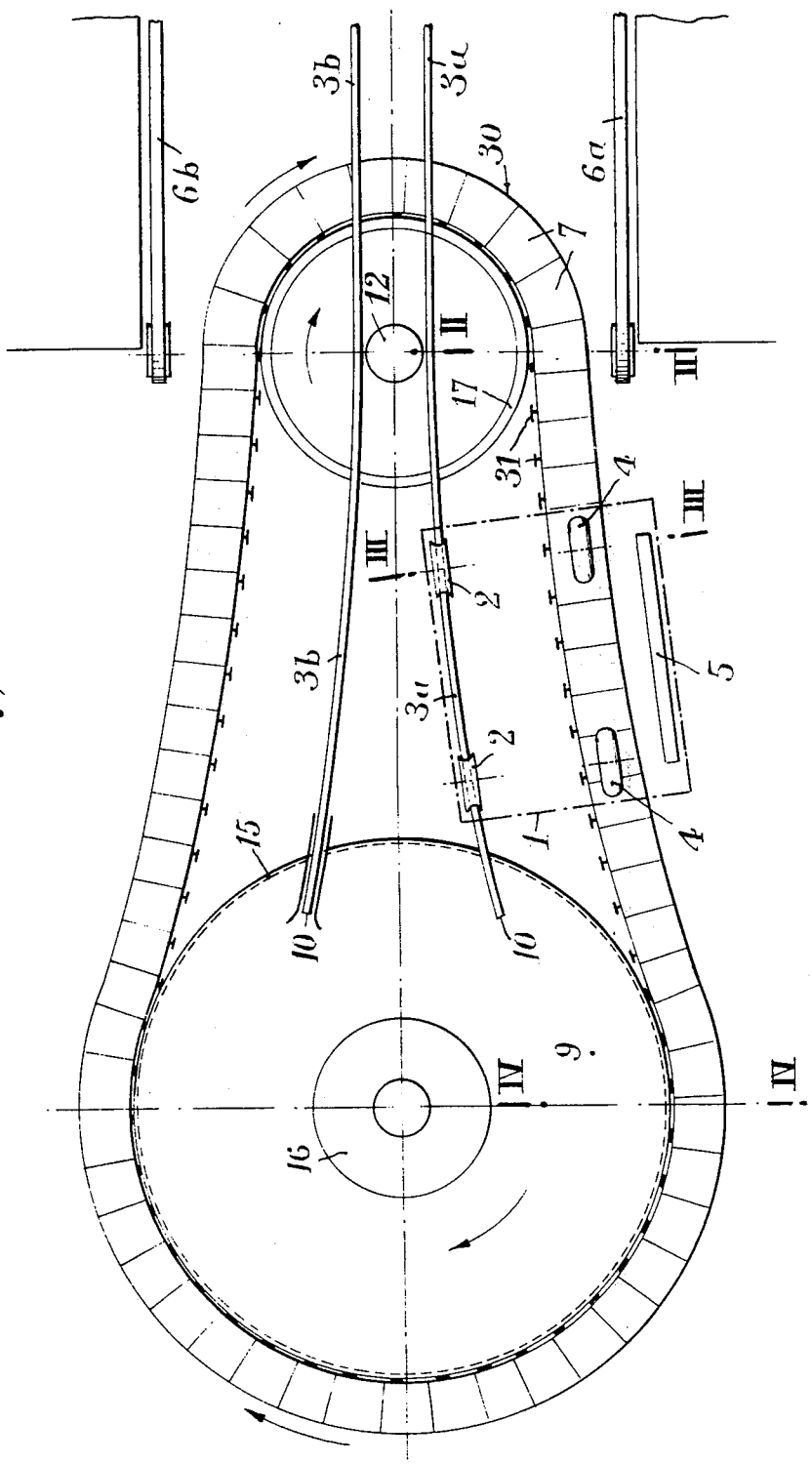
FIG. 1 is a diagrammatic plan view from above of the terminal station return loop structure according to this invention.

The terminal station of this vehicle transport system comprises a continuous return loop device characterised by a very reduced radius of curvature and by overall dimensions corresponding to about twice the width of a vehicle.

This station comprises an incoming rail 3a and a return rail 3b on which the pair of aligned wheels 2 supporting the platform or floor 1 of the vehicle are adapted to roll.

On either side of these rails 3a and 3b disembarking and embarking endless belts 6a and 6b, respectively, are provided and adapted to be engaged by guiding and braking shoes 5 carried by the vehicle, this engagement occuring when the vehicle completes the last section of the track line i.e. upon arrival at the terminal station.

In addition, the vehicle comprises a pair of lateral wheels 4 parallel to said aligned wheels 2 and equipped with braking means. The loop device comprises a conveyor proper 30 consisting essentially of a driving drum 17 mounted on a vertical shaft 12 and of a chain consisting of top plates 7 passing over this drum 17 and on a circular peripheral loop-forming guide member 15. This guide member 15 encircles a rotary platform 9 provided with means 16 of known type for driving said platform 9 in synchronism with the conveyor chain 7.

Each incoming and return rail 3a, 3b comprises in the vicinity of said platform 9 a bevelled end portion 10 substantially flush with the top surface of said platform 9.

The carrier wheels 2 must necessarily have two rolling-contact surfaces disposed in different planes so as to engage either the tubular rails 3 or the platform 9.

To this end, each wheel 2 may consist of a pair of parallel flanges 11 and a central groove 11a of semi-circular, concave cross-sectional shape, disposed between said flanges, whereby the wheel may engage either the rail 3 with its groove 11a (FIGS. 2 and 3) or the top surface of platform 9 with the peripheral edges of its flanges 11 (FIG. 4).

Another construction consists in using a wheel 13 having a flange 18 like ordinary railway wheels; thus, the tire surface 19 engages the rail 3 and the outer periphery 20 of flange 18 can roll on the platform 9 (FIG. 5).

Other profiles may be selected for the wheels 2, provided that they comprise two rolling surfaces operable in two different planes, namely the plane of rail 3 or the plane of platform 9.

OPERATION

When the vehicle arrives at the terminal station, it is guided and supported by the wheels 2 rolling on the carrier rail 3a, and driven by means of the shoe 5 engaging the belt 6a (FIG. 2).

At a properly determined location the same vehicle engages with its tires 4 the chain 7 of conveyor 30, whereby the vehicle is disconnected from the endless belt 6a and driven at a higher speed in order to create a gap between vehicles normally contacting each other on said belt 6 (FIG. 3).

Then the vehicle rolling beyond the end 10 of rail 3a is deposited upon the rotary platform 9 and bears on the top of this platform by means of the peripheral surface of the flanges 11 of wheels 2 (FIG. 4). The conveyor 30 still stupports the vehicle through its tire-mounted wheels 4 and rotates at the same angular velocity as the platform 9. The vehicle positions itself on the platform 9 through a combined slipping and rotational contact of its wheels 2. After a rotation of about 360° the vehicle re-engages a guide rail 3b of the return line, this rail 3b supporting the vehicle through its rim while the conveyor 30 continues to support the tire-mounted wheels 4. The vehicles keep moving on the rail 3b and conveyor 30 up to a well-defined location where the vehicle re-engages by means of its shoe 5 a movable endless belt 6b and is disconnected from the conveyor 30 of which the tire-mounted wheels 4 are now separated from the chain 7. In this novel position the vehicle is on the one hand guided and supported by the rail 3b and on the other hand supported and driven by the endless belt 6b so as to be ready for accomplishing another travel away from the station.

From the foregoing it is clear that transferring the wheels 2 from rail 3a to platform 9 or from this platform 9 to the rail 3b is possible only if the wheels 2 have two supporting surfaces disposed in different horizontal planes, one of which may consist of the circumference of one of the two flanges, and the other the bottom of a groove or of a wheel flange, or the inclined surfaces of a biconical or dog-bone shaped assembly.

To enable the conveyor 30 to revolve at the same linear velocity as the platform 9, the conveyor may be driven for instance by means of lugs 31 secured to the conveyor links under the top plates 7 supporting the tire-mounted wheels 4 and bearing on a driving lining 15 of elastomeric material (rubber) surrounding the platform 9.

The means for driving the conveyor, the shape of the component elements of the chain portion of this conveyor, the number and relative arrangement of the carrier wheels of the vehicle and of its conveyor-engaging driving wheels may depart of course from those described hereinabove and illustrated in the attached drawing by way of example, according to the type of transport system and vehicles contemplated.

What is claimed as new is:

1. In a transport system comprising at least one vehicle, a device for returning this vehicle at a line terminal, which comprises in combination:
    a conveyor forming a closed, partly circular loop at said terminal;
    a rotary platform having a substantially circular marginal portion, which is partly encircled by said conveyor;
    at least one lead-rail leading to said terminal and one return rail, both rails terminating with a bevelled portion in the vicinity of said platform marginal portion;
    conveyor engaging means carried by said vehicle to enable said vehicle to bear on said conveyor during the returning operation, and
    at least two wheels also carried by said vehicle and also adapted to constitute bearing member therefor, said wheels comprising each a first bearing surface located in a first plane and enabling said wheels to roll on said rails, and a second bearing surface located in a plane other than said first plane and enabling said wheels, after they leave said lead-rail and before they engage said return rail, to roll and slide on said platform.

2. The device according to claim 1, wherein said conveyor and said platform are driven at synchronous speeds.

3. The device according to claim 1, wherein said conveyor engaging means comprises at least one tire mounted wheel.

4. The device according to claim 1, wherein said two wheels consist each of a pair of flanges and a groove disposed between said flanges, said first bearing surface consisting of one portion of said groove and said second bearing surface consisting of a portion of at least one of said flanges.

* * * * *